United States Patent
Hamada et al.

(10) Patent No.: US 6,890,573 B1
(45) Date of Patent: May 10, 2005

(54) METHOD FOR APPLYING SAUCE AND METHOD FOR MANUFACTURING RICE CRACKER

(75) Inventors: Yoshiji Hamada, Watarai-gun (JP); Koji Ando, Watarai-gun (JP)

(73) Assignee: Masuya Co., Ltd., Watarai-gun (JP)

( * ) Notice: Subject to any disclaimer, the term of this patent is extended or adjusted under 35 U.S.C. 154(b) by 792 days.

(21) Appl. No.: 09/693,923

(22) Filed: Oct. 23, 2000

(51) Int. Cl.$^7$ .............................................. A23B 4/10
(52) U.S. Cl. ..................... 426/302; 426/99; 426/293; 426/303
(58) Field of Search ................ 426/293, 302, 426/303, 99

(56) References Cited

U.S. PATENT DOCUMENTS

| | | | | |
|---|---|---|---|---|
| 4,734,289 A | * | 3/1988 | Yamaguchi et al. | 426/302 |
| 4,794,015 A | * | 12/1988 | Fujita et al. | 426/589 |
| 4,877,630 A | * | 10/1989 | Okayama | 426/302 |
| 5,250,308 A | * | 10/1993 | Alexander et al. | 426/302 |

FOREIGN PATENT DOCUMENTS

| | | |
|---|---|---|
| JP | 54-35244 | 3/1979 |
| JP | 58-28231 | 2/1983 |
| JP | 3-39045 | 2/1991 |
| JP | 4-346757 | 12/1992 |
| JP | 7-184549 | 7/1995 |

\* cited by examiner

*Primary Examiner*—Lien Tran
(74) *Attorney, Agent, or Firm*—Kanesaka and Takeuchi (57) ABSTRACT

A baked dough of a soft-baked type is produced, and the surface of the baked dough is coated with the application of a fat and oil component. Then, an emulsified sauce is further applied onto the surface of the baked dough. Consequently, there can be obtained a soft-baked rice cracker which is uniformly coated with a sauce, has a mild taste, and is glossy, and whose surface makes a good appearance.

6 Claims, 6 Drawing Sheets

(4 of 6 Drawing Sheet(s) Filed in Color)

Application Method I

Baked dough a

Baked dough b

Baked dough c

Baked dough d

FIG.4

Application Method II

Baked dough a

Baked dough b

Baked dough c

Baked dough d

FIG.5

Application Method III

Baked dough a

Baked dough b

Baked dough c

Baked dough d

FIG.6

Application Method IV

Baked dough a

Baked dough b

Baked dough c

Baked dough d

METHOD FOR APPLYING SAUCE AND METHOD FOR MANUFACTURING RICE CRACKER

BACKGROUND OF THE INVENTION

1. Field of the Invention

The present invention relates to a method for manufacturing a rice cracker(Sembei). More particularly, it relates to a method for manufacturing a soft-baked rice cracker using an application method of a source. A rice cracker, in other words Sembei, is a kind of rice confectionery made from rice as a main material. Confectionery and confections are not limited to sweets in this specification.

2. Description of the Prior Art

Seasoning of a plain-baked rice cracker (below, referred to as a "baked dough") is accomplished by applying an aqueous sauce onto the surface of the baked dough. For a hard-baked rice cracker which has a high density and provides a hard texture to the eater, by simply applying an aqueous sauce onto the baked dough, appropriate and uniform coating of the sauce can be accomplished.

Further, it has already been known that rice confectionery is coated with fats and oils for enhancing the gloss of the products, preventing soaking of an aqueous seasoning solution therein, and the like. Further, there has been developed a fat and oil composition having a predetermined component as a technology for solving various problems when coating is accomplished with a commonly used edible fat and oil such as a soy bean oil (Japanese Laid-Open Patent Publication No.Sho 54-35244 and 58-28231, and Japanese Laid-Open Patent Publication No.Hei 4-346757).

In Japanese Laid-Open Patent Publication No.Sho 54-35244, there is described a fat and oil composition for coating rice confectionery, which is excellent in quality, flavor, and conservation stability, and handling thereof. The fat and oil composition includes 40% by weight or more of a vegetable liquid oil such as a rice oil or a corn oil, 60% by weight or less of a palm oil, and 0.1 to 2% by weight of lecithin, and has an ascending melting point of 23° C. or less. Example 2 in this publication describes that a rice oil, a palm fractionated oil, lecithin, and a tamari soy source are charged and sufficiently mixed, in which cubic rice crackers are immersed.

In Japanese Laid-Open Patent Publication No.Sho 58-28231, there is described a method for manufacturing rice confectionery in which a rice confection material is immersed in a fat and oil composition including 40 to 80% by weight of a vegetable liquid oil, 20 to 60% by weight of a palm oil, and 0.1 to 2% by weight of lecithin, and having an ascending melting point of 5 to 23° C., thereby to be coated with the fat and oil. This publication describes as with the foregoing Japanese Laid-Open Patent Publication No.Sho 54-35244 that a rice oil, a palm fractionated oil, lecithin, and a tamari soy source are charged and sufficiently mixed, in which cubic rice crackers are immersed (Japanese Laid-Open Patent Publication No.Sho 558-28231, Example 2).

In Japanese Laid-Open Patent Publication No.Hei 4-346757, there is disclosed a phospholipid mixture having a ratio of weight of phospholipid not containing a nitrogen atom to phospholipid containing a nitrogen atom of 1.0 or more, a glyceride mixture containing 10 to 99.9% by weight of diglyceride, or the like, as a fat and oil composition for coating, which will less undergo flavor deterioration due to conservation. As the raw material for the phospholipid mixture, there is mentioned lecithin derived from a plant seed. This publication also describes that coating is accomplished by using a mixture of an aqueous seasoning solution and a fat and oil composition.

Further, it is known that a sauce containing a starch is emulsified and applied on a rice confection for preparing a rice confection having excellent flavor, texture, and resistance to the teeth, and free from stickiness (Japanese Laid-Open Patent Publication No.Hei 3-39045). This publication describes that the sauce has such a composition that the weight ratio of water to starch is 5:1 to 3:2, and the weight ratio of water to edible fat and oil is 20:1 to 5:1. The publication also describes that the sauce is emulsified with a food emulsifier comprising glycerol fatty acid ester, sorbitan fatty acid ester, sucrose fatty acid ester, and the like.

Still further, there is also disclosed a method for manufacturing a cracked rice cracker having excellent qualities such texture, and production efficiency as another example using an emulsion (Japanese Laid-Open Patent Publication No.Hei 7-184549). This publication describes that a mixed emulsion of water and oil having a 20 to 50% oil content is added to a dough which has just been dried, followed by baking.

SUMMARY OF THE INVENTION

Incidentally, rice confections such as rice crackers are roughly divided into "soft-baked" and "hard-baked" types according to the hardness thereof. The soft-baked rice cracker has a lower hardness as compared with the hard-baked rice cracker, and hence provides a soft texture. Further, the surface of the soft-baked rice cracker has more micropores and fine asperities as compared with the hard-baked rice cracker. As one of the techniques for numerically differentiating between the soft-baked rice cracker (or baked dough) and the hard-baked rice cracker, a specific volume ($cm^3/g$) may be used. In this specification, the soft-baked rice cracker denotes a nonglutinous rice confection made from a nonglutinous rice as a main material, and having a specific volume of more than 4.0 $cm^3/g$ (the non-glutinous rice is one type of rices). As the soft-baked products thereof, the ones with a specific volume of about 4.3 $cm^3/g$ are predominantly commercially available. In contrast, as the hard-baked products thereof, products with a specific volume of about 3.5 $cm^3/g$ seem to dominate. Further, a determination method of the specific volume will be separately described below.

For the soft-baked rice cracker which has a larger specific volume than that of the hard-baked type (in other words, a lower density than that of the hard-baked type), and provides a soft texture to a eater, there occur the following problems even when the baked dough is simply coated with an aqueous sauce. For example, there occur the problems as follows: the sauce soaks into the inside of the rice cracker too much so that the rice cracker is too highly seasoned, the sauce partially soaks therein so that inconsistencies in seasoning occurs; and the dough for a rice cracker absorbs moisture to shrink; and the appearance of the rice cracker is bad.

This is attributable to the following fact. That is, the softer it is (the greater the specific volume is), the more micropores and asperities exist on the surface as compared with the hard-baked rice cracker, and at the interface between the liquid (sauce) and the solid (baked dough), the interfacial surface energy is smaller than the sum of the surface energies of the liquid and the solid.

In a process of seasoning a rice cracker, although a sauce is applied thereon upon adjusting the baked dough temperature and the sauce temperature conditions, there occurs a difference in resulting quality thereof according to the amount of the soluble starch to be mixed in the sauce for adjusting the flavor, the viscosity, and the like. There is a theory that the amount of the soluble starch to be added relative to the soy sauce constituting the sauce is preferably 28 to 33% for the soft-baked type (specific volume: about 4.3 cm³/g), and about 22 to 28% for the hard-baked type (specific volume: about 3.5 cm³/g) partly for the purpose of achieving good topping without soaking of the sauce into the baked dough.

However, even if the soluble starch is contained therein in an amount of 28 to 33%, the foregoing problem still tends to occur when the sauce is directly applied on the baked dough of a soft-baked type. Further, the soft-baked rice cracker is extremely susceptible to the effect of the soluble starch content. Even when the viscosity of the sauce is slightly reduced by decreasing the amount of the soluble starch to be added, the extent to which the sauce soaks into the baked dough remarkably increases, and the possibility that various problems as described above occur is further increased. On the other hand, when the soluble starch content is increased to increase the viscosity of the sauce, the workability of coating tends to deteriorate. Particularly, uniform coating of the surface becomes complicated. Further, an increase in viscosity makes it difficult to control the deposition amount of the sauce, and thus the adjustment of the taste of the rice cracker tends to be difficult. Namely, the adjustment of the viscosity of the sauce by the amount of the soluble starch in a balanced manner becomes increasingly more difficult with an increase in specific volume of the baked dough.

In order to prevent the sauce from soaking into the baked dough of a soft-baked type, as described in the foregoing prior art, there is a conceivable method in which a fat and oil component is previously applied onto the surface of the baked dough to form an oil layer on the surface of the baked dough. By forming the oil layer, it is possible to increase the interfacial surface energy for preventing an excess wetting with the sauce. However, for a low viscosity sauce having a low soluble starch content, the liquid-solid interfacial surface energy is far larger than the sum of the surface energies of the liquid and the solid, and hence the sauce is repelled therefrom. The sauce repellence entails the situation where the sauce tends to be localized on the baked dough surface. Namely, it is still difficult to achieve uniform coating of the sauce thereon.

Such being the case, it is also conceivable that the content of the soluble starch is increased to increase the viscosity of the sauce. However, when the viscosity of the sauce is increased too much as described above, there still occur deficiencies in terms of complication of the coating work, control of the deposition amount of the sauce, adjustment of the taste of the rice cracker, and the like.

Further, there is also conceivable another method in which an emulsified sauce is directly coated on the surface of the baked dough for a purpose of achieving a flavorous seasoning, and the like. However, the baked dough which is continuously baked not necessarily shows a constant specific volume, and exhibits variations in surface energy of the solid. With the method in which the emulsified sauce is directly coated on the surface of the baked dough, the sauce having a constant surface energy is coated on the dough having different surface energies resulting from variations in baking. Thus, under the same processing (coating) conditions, there occur variations in deposited state from one baked dough to another baked dough.

As described above, in actuality, even the method whereby coating of the sauce can be accomplished successfully to a sufficient degree for the hard-baked rice cracker is not sufficient for the soft-baked rice cracker. Such being the case, there has been a demand for a method for applying a sauce more suitable for the soft-baked rice cracker.

It is an object of the present invention to provide a process of uniformly applying a sauce on the surface of the baked dough of a soft-baked type with ease, and further a method for manufacturing a soft-baked rice cracker uniformly coated with the sauce, whereby the foregoing various problems in manufacturing of the soft-baked rice cracker are solved. The present inventors have conducted a close study on the composition of the sauce, the timing of applying the sauce, and the like. As a result, they have found the following fact. Namely, a fat and oil component is previously coated on the baked dough, and then an emulsified sauce is coated thereon. Consequently, such an effect can be obtained that even the soft-baked rice cracker can be uniformly coated with the sauce on its surface with ease. Thus, they have completed the present invention.

Namely, the present invention is as follows:

(1) A method for applying a sauce to a rice cracker, in which the surface of the baked dough of a soft-baked type is coated with a fat and oil component, and then an emulsified sauce is applied on the surface of the baked dough coated with the fat and oil component.

(2) The method for applying a sauce to a rice cracker according to the aforesaid method (1), wherein the specific volume of the baked dough is 5.0 to 6.5 cm³/g.

(3) The method for applying a sauce according to the aforesaid method (1), wherein the viscosity of the emulsified sauce is 50 to 800 cP.

(4) A method for manufacturing a soft-baked rice cracker, comprising the steps of: producing a baked dough of a soft-baked type; coating the surface of the baked dough with the application of a fat and oil component; and applying an emulsified sauce onto the surface of the baked dough coated with the fat and oil component.

(5) The method for manufacturing a soft-baked rice cracker according to the aforesaid method (4), wherein the specific volume of the baked dough is 5.0 to 6.5 cm³/g.

(6) The method for manufacturing a soft-baked rice cracker according to the aforesaid method (4), wherein the viscosity of the emulsified sauce is 50 to 800 cP.

(7) The method for manufacturing a soft-baked rice cracker according to the aforesaid method (4), wherein the fat and oil component to be applied for coating the surface of the baked dough before applying the emulsified sauce is vegetable oils and fats.

(8) The method for manufacturing a soft-baked rice cracker according to the aforesaid method (4), wherein the emulsified sauce contains a soy sauce as an aqueous sauce, a safflower oil and/or a rice oil as a fat and oil component, and lecithin and/or monoglyceride as an emulsifier.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE INVENTION

(1) Method for Applying a Sauce of the Present Invention

With a method for applying a sauce of the present invention, a fat and oil component is previously applied onto the surface of a baked dough for coating the surface thereof with the fat and oil component. Thereafter, an emulsified sauce is applied onto the surface coated with the fat and oil component. In the present invention, the baked dough is of a soft-baked type. The method for manufacturing the baked dough of a soft-baked type will be separately described below.

The method for applying a sauce of the present invention can be preferably used for a soft-baked rice cracker having a specific volume of more than 4.0 cm$^3$/g, and it can also be preferably used even for a soft-baked rice cracker having a specific volume of 5.0 cm$^3$/g or more. From the comprehensive viewpoint of the taste, appearance, and the like, the specific volume of the dough is preferably 5.0 to 6.5 cm$^3$/g, and more preferably 5.5 to 6.0cm$^3$/g (both inclusive, and the same applies to those that follow).

The specific volume of a rice cracker is described, for example, in "Rice Confection Manufacturing Basic Technology Course" (published by Niigata Prefecture Rice Cracker Industry Co-operative Association), or the like, and a general outline thereof is as follows. It is noted that, in this document, the one corresponding to the "baked dough" in this specification may sometimes be referred to as a "plain-baked dough", "soft-baked type" as a "Ukimono (Well swelled product)", and "specific volume" simply as "volume". The weight B (g) of the baked dough to be determined is determined. The baked dough is crashed into appropriate-sized pieces, and placed in a graduated cylinder. Then, the washed sand is charged in the graduated cylinder in such an amount capable of sufficiently immersing the rice cracker pieces placed in the graduated cylinder. The volume V (cm$^3$) of the sand to be charged into the graduated cylinder is previously determined. The volume W (cm$_3$) of a mixture of the baked dough and the sand in the graduated cylinder is determined. The specific volume is determined from the following formula:

$$\text{Specific volume} = (W-V)/B (\text{cm}^3/g)$$

As the fat and oil component to be applied on the baked dough before applying the emulsified sauce thereon, an edible fat and oil component can be used. Preferred examples thereof include vegetable oils and fats, animal oils and fats, and the like. More specifically, mention may be made of a soy bean oil, a rape oil, a cotton seed oil, a safflower oil, an olive oil, a corn oil, a palm oil, a rice oil, a sunflower oil, and a sesame oil, or hydrogenated hardened oils thereof. Out of these, the rice oil, corn oil, cotton seed oil, rape oil, safflower oil and the like are particularly preferred from the viewpoints of enhancement of the flavor of the rice cracker, and the like. These fat and oil components may be used singly, or in mixture of two or more thereof.

The emulsified sauce is obtained by emulsifying a sauce. The sauces commonly used for rice crackers are often aqueous ones. In the method for applying a sauce of the present invention, the one obtained by emulsifying the aqueous sauce is used. The sauce has no particular restriction so long as it is an aqueous liquid for seasoning. Examples thereof include seasoning liquid such as a soy sauce. Various seasonings such as starch, sugar, monosodium glutamate, sake, and a sweet kind of sake may be mixed into the aqueous sauce prior to being emulsified. The emulsified sauce may assume any forms so long as it is an emulsion of an oil-in-water type, a water-in-oil type, or the like. However, the oil-in-water type emulsified sauce is preferred in terms of the capability of enhancing the flavor of the rice cracker, and the like. Further, in the case of the sauce containing a soy sauce as a main component, the harsh salty taste of the sauce is removed by emulsification, and hence the resulting rice cracker exhibits a mild flavor.

As the fat and oil component to be mixed into the emulsified sauce, any fat and oil component may be used so long as it is an edible fat and oil component. As the preferred examples thereof, mention may be made of the same fat and oil components as described above, to be previously applied on the baked dough prior to coating the emulsified sauce thereon. From the viewpoints of enhancement of the flavor of the rice cracker, and the like, a rice oil, a corn oil, a cotton seed oil, and the like are particularly preferred.

Further, the fat and oil component to be previously applied singly and the fat and oil component to be used as a component of the emulsified sauce may be the same or different.

Any emulsifiers may be used for the emulsified sauce so long as they are edible components. Preferred examples thereof include lecithin, glycerin fatty acid ester, and sucrose fatty acid ester, and more preferred examples thereof include monoglycerin fatty acid ester.

The aqueous sauce, the fat and oil component, and the emulsifier, which are the components of the emulsified sauce, may be used singly, or in mixture of two or more thereof.

The amount of each component to be mixed can be determined by being appropriately adjusted according to the type, amount, and the like, of each component. The weight ratio of the aqueous sauce to the fat and oil component depends upon the type of the aqueous sauce, but preferably about 5 to about 40 parts by weight of the fat and oil component is contained for every 100 parts by weight of the aqueous sauce, and more preferably about 5 to about 30 parts by weight of the fat and oil component is contained for every 100 parts by weight of the aqueous sauce from the viewpoints of the adhesion of the sauce and the flavor of the rice cracker.

The viscosity of the emulsified sauce is preferably 50 to 800 cP, and more preferably about 200 to about 350 cP. Defining of the viscosity of the emulsified sauce within such a range is preferable in terms of uniform deposition of the emulsified sauce in working.

The emulsified sauce can be manufactured by mixing an aqueous sauce, a fat and oil component, and an emulsifier by means of a homogenizer, or the like in accordance with an ordinary method for manufacturing an emulsion.

Further, into the emulsified sauce, there may be mixed various seasonings such as salt and sugar for adjusting the taste, or there may be mixed a starch for adjusting the flavor and viscosity of the sauce, and the like, after emulsification in such a range as not to impair the state of the emulsion.

With the method for applying the sauce of the present invention, the fat and oil component is previously applied onto the surface of the baked dough prior to applying the emulsified sauce thus manufactured, and the emulsified sauce is then applied onto the surface of the baked dough. It is sufficient that the fat and oil component to be previously applied is applied so as to cover at least the portion to be coated with the emulsified sauce later. Therefore, it may be applied with a common method for coating a solid with a liquid in a food industry, and the like. Further, the emulsified sauce may be applied by being appropriately adjusted according to the strength of the seasoning thereof, and can be applied with a common method as described above. For example, the fat and oil component or the emulsified sauce can be applied onto the surface of the baked dough by means such as brush coating, spray coating, or immersing the baked dough in the fat and oil component or the emulsified sauce.

According to the method for applying a sauce of the present invention, the sauce can be uniformly applied onto the surface of the baked dough with ease. The uniformly applied sauce is held on the surface of the baked dough without soaking too much into the baked dough. Further, the method for applying a sauce of the present invention is excellent in workability, and facilitates the uniform application of the sauce.

(2) Method for Manufacturing a Rice Cracker

The method for manufacturing a rice cracker of the present invention is the method for manufacturing a soft-baked rice cracker, and characterized by adopting the foregoing method for applying a sauce. Namely, the baked dough of a soft-baked rice cracker is manufactured, and a fat and oil component is previously applied on the baked dough. Then, an emulsified sauce is applied thereon, and dried to prepare a finished product of a rice cracker.

Figure 1:
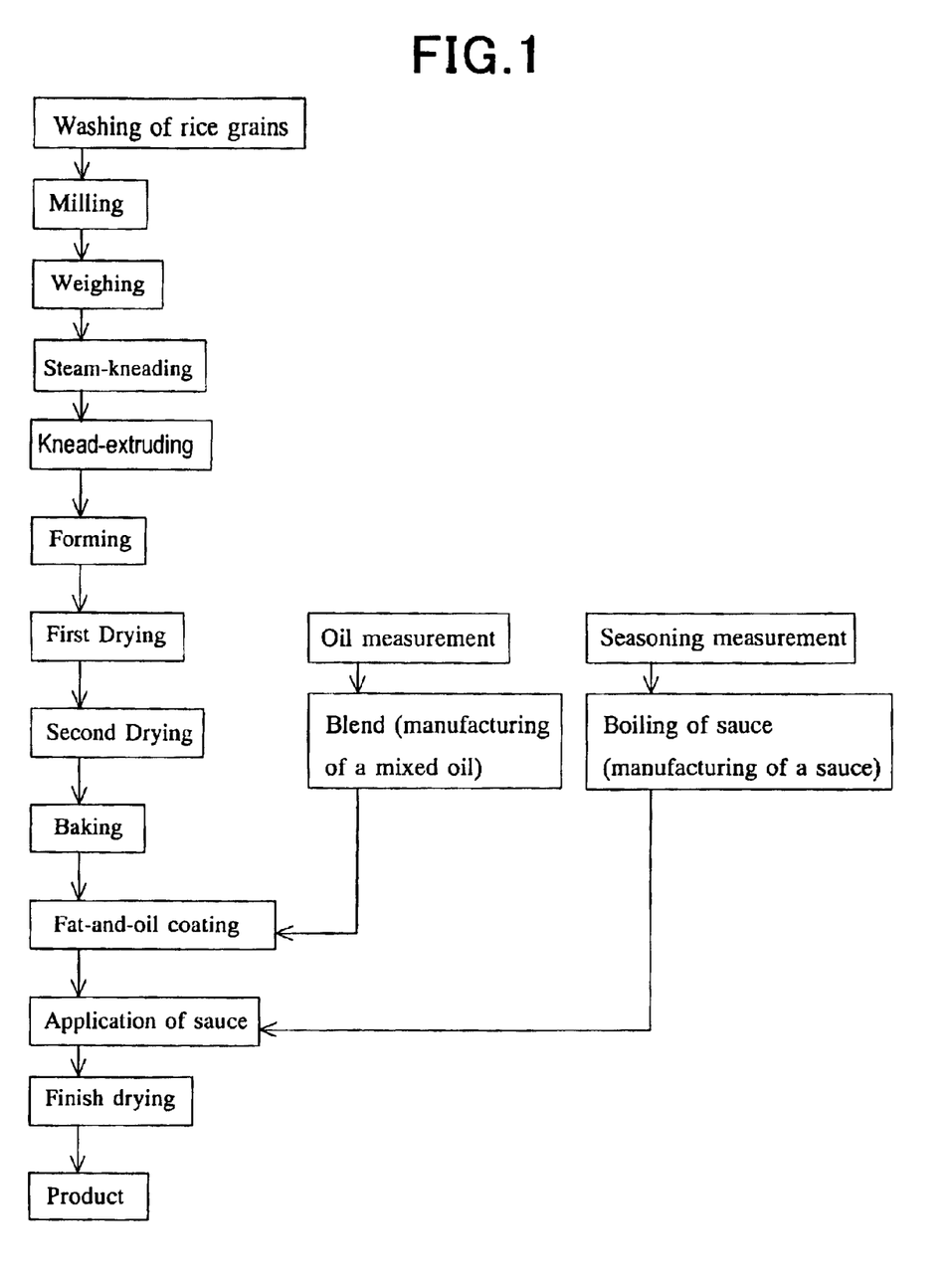
FIG. 1 is a flow chart showing one example of the manufacturing processes of a method for manufacturing a soft-baked rice cracker of the present invention.

The method for manufacturing the baked dough of a soft-baked rice cracker is described in the aforesaid document "Rice Confection Manufacturing Fundamental Technology Course", or the like. In the method for manufacturing a rice cracker of the present invention, there can be adopted such a baked dough of a rice cracker of a so-called soft-baked type. As the preferred method for manufacturing the baked dough of a soft-baked type, mention may be made of a method comprising the following steps.
That is, through
 (i) a step of milling a raw material rice;
 (ii) a step of steam-kneading the milled rice;
 (iii) a step of further kneading the dough resulting from steam-kneading (knead-extruding step);
 (iv) a step of forming a rice dough;
 (v) a step of drying the formed rice dough; and
 (vi) a step of baking the formed rice dough to obtain a baked dough, the baked dough is manufactured. FIG. 1 shows an exemplification of the manufacturing steps of the soft-baked rice cracker including the steps up to baking.

As compared with the hard-baked rice cracker, the general conditions for manufacturing the soft-baked rice cracker is characterized by the following facts. Namely, for the soft-baked rice cracker, milling is accomplished so as to obtain finer grains than in the case of the hard-baked type. In the case of the soft-baked type, kneading is accomplished more forcibly than in the case of the hard-baked type in knead-extruding after steam-kneading so that a large number of voids are contained in the resulting dough. The rice dough obtained in the knead-extruding step is then dried so that moisture is contained therein in an amount of about 10%. In the case of the soft-baked type, drying is preferably accomplished in two separate stages in order to make the distribution of the moisture constant. In the case of the hard-baked type, it is 13 to 14%. Further, in baking the dried rice dough in a traveling oven, for example, baking is accomplished by changing the heating power over three separate stages of the earlier, intermediate, and latter stages. For baking of the soft-baked type, baking is preferably accomplished in such a manner that the heating power is increased at a time in the intermediate stage to expand the dough. In contrast, for the hard-baked type, in general, the heating power is increased in the earlier stage to bake the surface thereof.

Onto the baked dough thus manufactured, a sauce is applied in accordance with the method described in the foregoing method (1) for applying a sauce of the present invention. After applying the emulsified sauce, the sauce is dried to obtain a rice cracker as a product. Incidentally, after applying the emulsified sauce, before and after drying the sauce, an additional treatment may be conducted for further adding another seasoning, and the like. For example, the following treatments may be performed. Namely, various seasonings such as salt, hot pepper, pepper, and sesame may be added thereto, dried or toasted laver and the like may be attached thereto, and another sauce may be further applied onto a part of the dough after applying the emulsified sauce.

The method for manufacturing a rice cracker of the present invention can provide the effects due to the foregoing method for applying a sauce, as well as the following effects. Namely, the method for manufacturing a rice cracker of the present invention can provide a rice cracker having a mild taste. As for the soy sauce-based sauce, there can be provided a flavorful rice cracker having a mild taste free from the harsh soy sauce taste. Further, the method for manufacturing a rice cracker of the present invention can enhance the appearance such as gloss of the finished rice cracker.

EXAMPLE

Below, the present invention will be described in more details by way of examples.

1. Manufacturing of an Emulsified Sauce

The components shown in Table 2,3 or 4 were mixed as a soy sauce(as an aqueous sauce), a fat and oil component, an emulsifier, and the like, and emulsified by using a homogenizer under the conditions of a number of revolutions of 3000 rpm, for 10 minutes, and a sauce temperature of 60° C. to manufacture two types of emulsified sauces (b),(c),(d).

Further, the components shown in Table 1 were mixed, and emulsified by using a homogenizer under the conditions of a number of revolutions of 10000 rpm, for 10 minutes, and a sauce temperature of 65° C. to manufacture an emulsified sauce (a).

TABLE 1

Composition of Emulsified Sauce (a)

| Component | Compounding ratio (part by weight) |
|---|---|
| Soy sauce | 100 |
| Sugar | 45 |
| Rice oil | 24 |
| Soluble starch | 16 |
| Dextrin | 13 |
| Monoglyceride | 1 |
| Monosodium glutamate | 1 |

Viscosity: 320 cP
Salinity: 7.1%

TABLE 2

Composition of Emulsified Sauce (b)

| Component | Compounding ratio (part by weight) |
|---|---|
| Soy sauce | 100 |
| Sugar | 45 |
| Rice oil | 24 |
| Dextrin | 8 |
| Lecithin | 0.4 |

Viscosity: 60 cP

TABLE 3

Composition of Emulsified Sauce (c)

| Component | Compounding ratio (part by weight) |
|---|---|
| Soy sauce | 100 |
| Sugar | 47 |
| Soluble starch | 23 |
| Rice oil | 7 |
| Monosodium glutamate | 3 |
| Dextrin | 2 |
| Glycerin fatty acid ester | 2 |

Viscosity: 225 cP

TABLE 4

Composition of Emulsified Sauce (d)

| Component | Compounding ratio (part by weight) |
|---|---|
| Soy sauce | 100 |
| Sugar | 21 |
| Soluble starch | 13 |
| Rice oil | 7 |
| Monosodium glutamate | 1 |
| Dextrin | 13 |
| Glycerin fatty acid ester | 0.7 |

Viscosity: 220 cP

2. Manufacturing of a Soft-baked Rice Cracker

A soft-baked rice cracker coated with the above-described emulsified sauce was manufactured in the following manner.

(2-1) Manufacturing of a Baked Dough

The raw material rice was milled by means of a mill so as to obtain such a grain size that 55 wt % of the powder remained when the powder was shifted through a 250-μm-mesh sieve. After milling, the rice powder and water were weighed to be mixed. The amount of the moisture was adjusted so that the moisture of the dough after being steam-kneaded was about 48% (the moisture at this step is appropriately adjusted according to the type of a steam kneader, and the conditions for steam-kneading). After mixing the rice powder and water, the mixture was steam-kneaded under a pressure of 0.6 atmosphere for 12 minutes. The dough resulting from steam-kneading was further kneaded by means of an extruder to obtain a rice dough. The rice dough was stretched to a thickness of about 2 mm, and stamped out through a mold to be formed. The formed rice dough was dried in two separate stages. A first drying process was conducted under the conditions of 75° C. for about 3 hours, and the dough was dried until the moisture content of the dough was about 18%. A subsequent second drying process was conducted under the conditions of 85° C. for about 2 hours, and the dough was dried until the moisture content of the dough was about 11%. The rice dough resulting from drying was baked by means of a baking machine. The baking machine has first to third zones through which the dough passes, and each zone has almost the same length. The temperatures were respectively set at 160 to 200° C. for the first zone, 260 to 300° C. for the second zone, and 200 to 210° C. for the third zone. The rice dough was allowed to pass through the first to third zones at a constant speed for about 2 minutes.

(2-2) Application of a Sauce

A coating oil was prepared by mixing a rice oil and a cotton seed oil in a ratio of 6:4 (weight ratio). The baked dough was immersed in the coating oil adjusted at 60° C. for coating. After excluding an excess oil therefrom, the baked dough coated with the fat and oil was immersed in any of the emulsified sauce (a), (b), (c), or (d). An excess sauce was excluded therefrom, and the dough was sufficiently dried to obtain a soft-baked rice cracker.

3. Manufacturing of Baked Doughs With Different Specific Volumes

After washing rice grains, flatly pressing was conducted for each washed rice of a different grain size (Table 5), and then through the steam-kneading and the knead-extruding steps, stretching and stamping were conducted. The first drying was performed taking a moisture content of 18% as a guide, and the dried rice dough was cured for 24 hours or more. After conducting the second drying taking a moisture content of 13.5% as a guide for the hard-baked dough (specific volume of 4 cm$^3$/g or less), and taking a moisture content of 11% as a guide for the soft-baked dough (specific volume of more than 4 cm$^3$/g) in a proofing box, the doughs a to d were baked in a baking furnace (Table 6). Each heating power in the baking machine was controlled under the same conditions in the above description (2-1).

TABLE 5

Grain Size of Powder

| | Flatly pressed powder grain size | Number of kneading | Moisture content: before baking |
|---|---|---|---|
| Dough a | Very coarse | 1 | About 13.5% |
| Dough b | Coarse | 1 | About 13.5% |
| Dough c | Fine | 2 | About 11.0% |
| Dough d | Very fine | 2 | About 11.0% |

It is noted that, "very coarse" denotes the degree to which about 80% of the powder after milling remains on a 250-

µm-mesh sieve, "coarse" denotes the degree to which about 75% thereof remains, "fine" denotes the degree to which about 65% thereof remains, and "very fine" denotes the degree to which about 55% thereof remains.

TABLE 6

Property of Each Dough

| | Weight (g/10 sheets) | Dimensions (mm) | Specific volume (cm³/g) |
|---|---|---|---|
| Dough a | 36.6 | 45.8 × 42.6 × 6.7 | 3 |
| Dough b | 34.7 | 48.2 × 45.3 × 6.8 | 4 |
| Dough c | 31.6 | 60.3 × 57.6 × 6.8 | 6 |
| Dough d | 32.5 | 62.2 × 61.2 × 7.5 | 7 |

4. Application Test of a Sauce

An application test of a sauce was performed by using the doughs a to d with the following application methods I to IV.

Application method I: an aqueous sauce is applied on the surface of the baked dough.

Application method II: an emulsified sauce is applied on the surface of the baked dough.

Application method III: after applying an oil on the surface of the baked dough, an aqueous sauce is applied thereon.

Application method IV: after applying an oil on the surface of the baked dough, an emulsified sauce is applied thereon.

With the application methods I and II, the dough was warmed in an oven at 80° C. for 1 hour or more, and then immersed in a 60° C. sauce for applying the sauce thereon (incidentally, the warming of the dough in the oven was conducted for rewarming the dough which had cooled to facilitate the experiment). With the application methods III and IV, the dough was warmed in the same manner, and immersed in a 60° C. rice oil, and then immersed in a 60° C. sauce for applying the sauce thereon.

The time required to immerse the dough in a sauce or an oil was set at 10 seconds. Further, the time required to shake off an excess sauce or oil after immersion was also set at 10 seconds. After applying the sauce on the dough, the dough was subjected to final drying in a 80° C. oven to obtain a product.

It is noted that as the aforesaid emulsified sauce (a) was used as an emulsified sauce. Further, a mixture of the components shown in Table 7 below was used as an aqueous sauce.

TABLE 7

Composition of Aqueous Sauce

| Component | Compounding ratio (part by weight) |
|---|---|
| Soy sauce | 100 |
| Soluble starch | 16 |
| Dextrin | 13 |
| Sugar | 45 |
| Monosodium glutamate | 1 |

Viscosity: 180 cP
Salinity 8.3 wt %

(4-1) Measurement of the Deposition Amount of a Sauce

Figure 2:
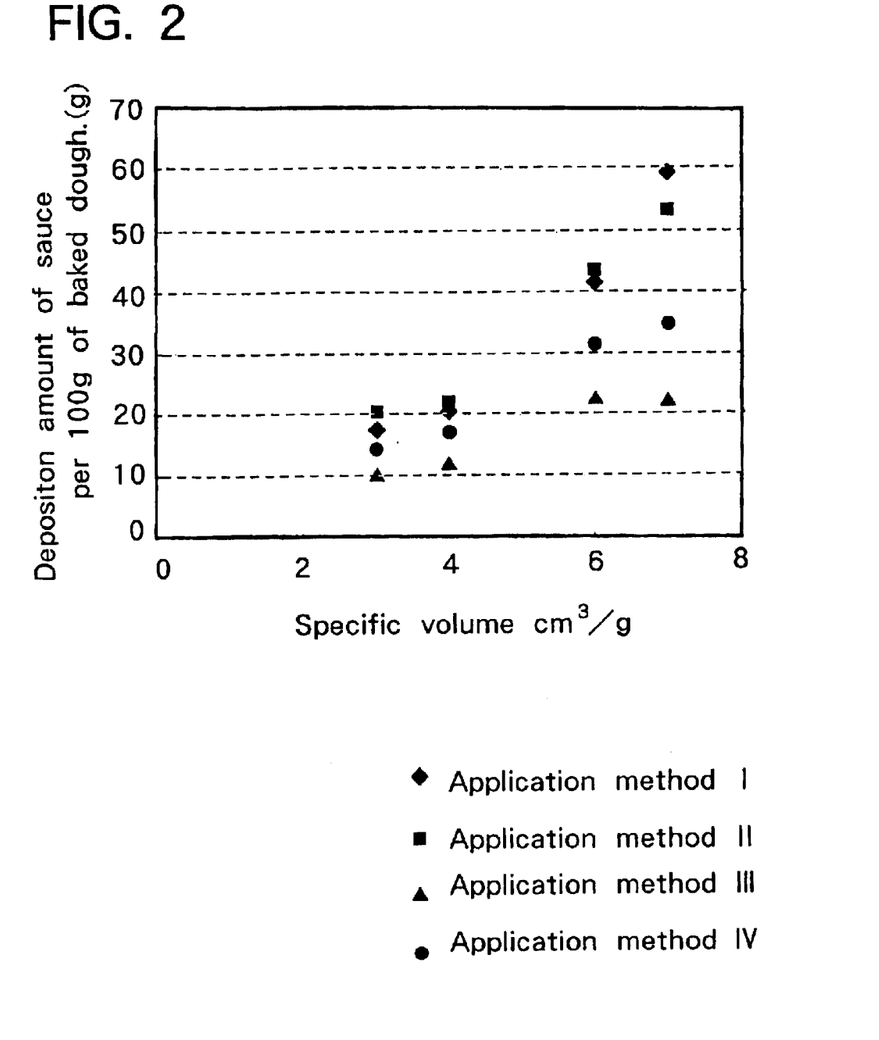
FIG. 2 is a view showing the relationship between the specific volume and the deposition amount of the sauce.
Figure 3:
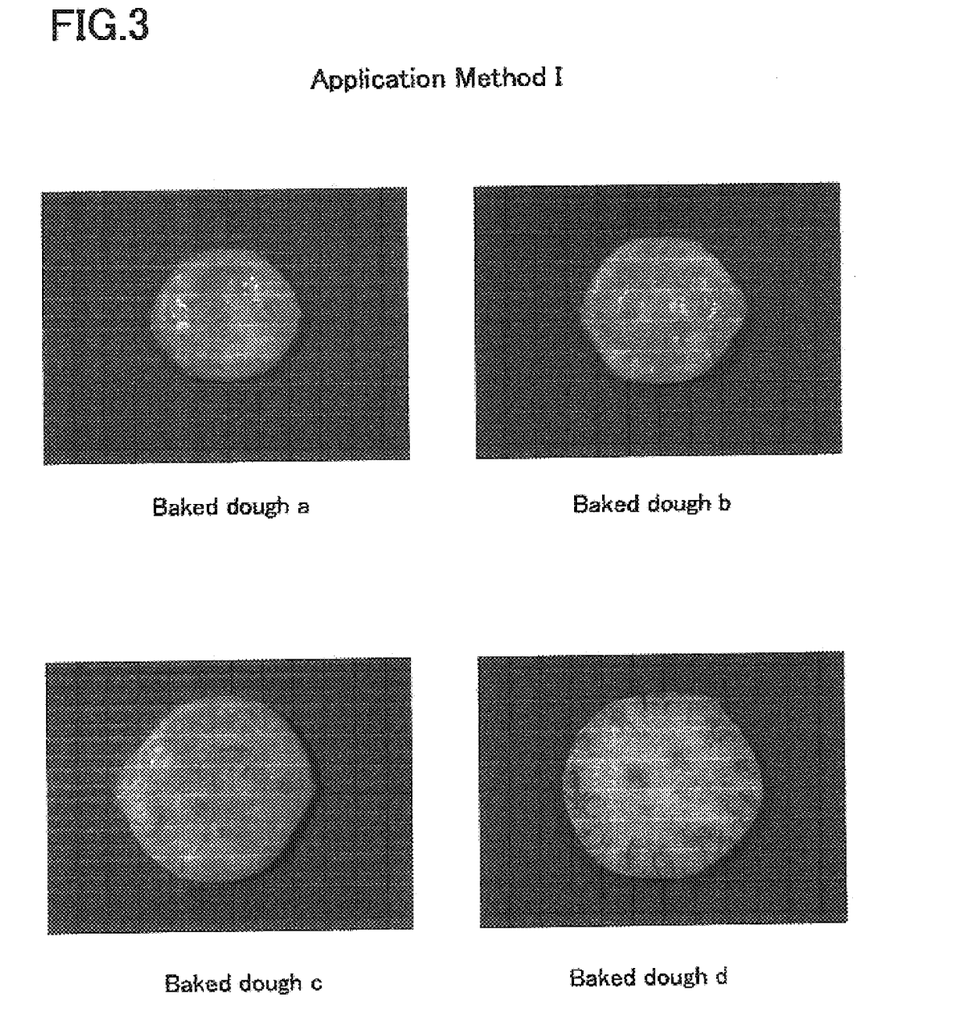
FIG. 3 is a view showing photographs of baked doughs a to d each with a sauce applied thereon by an application method I.
Figure 4:
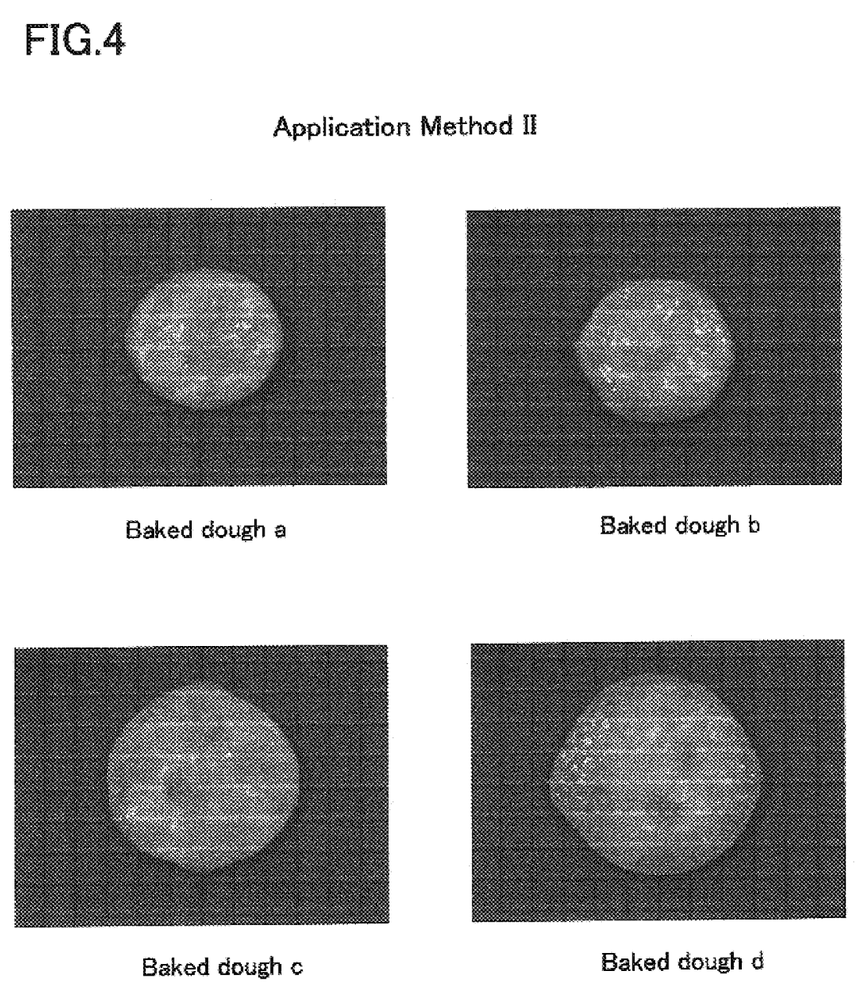
FIG. 4 is a view showing photographs of baked doughs a to d each with a sauce applied thereon by an application method II.
Figure 5:
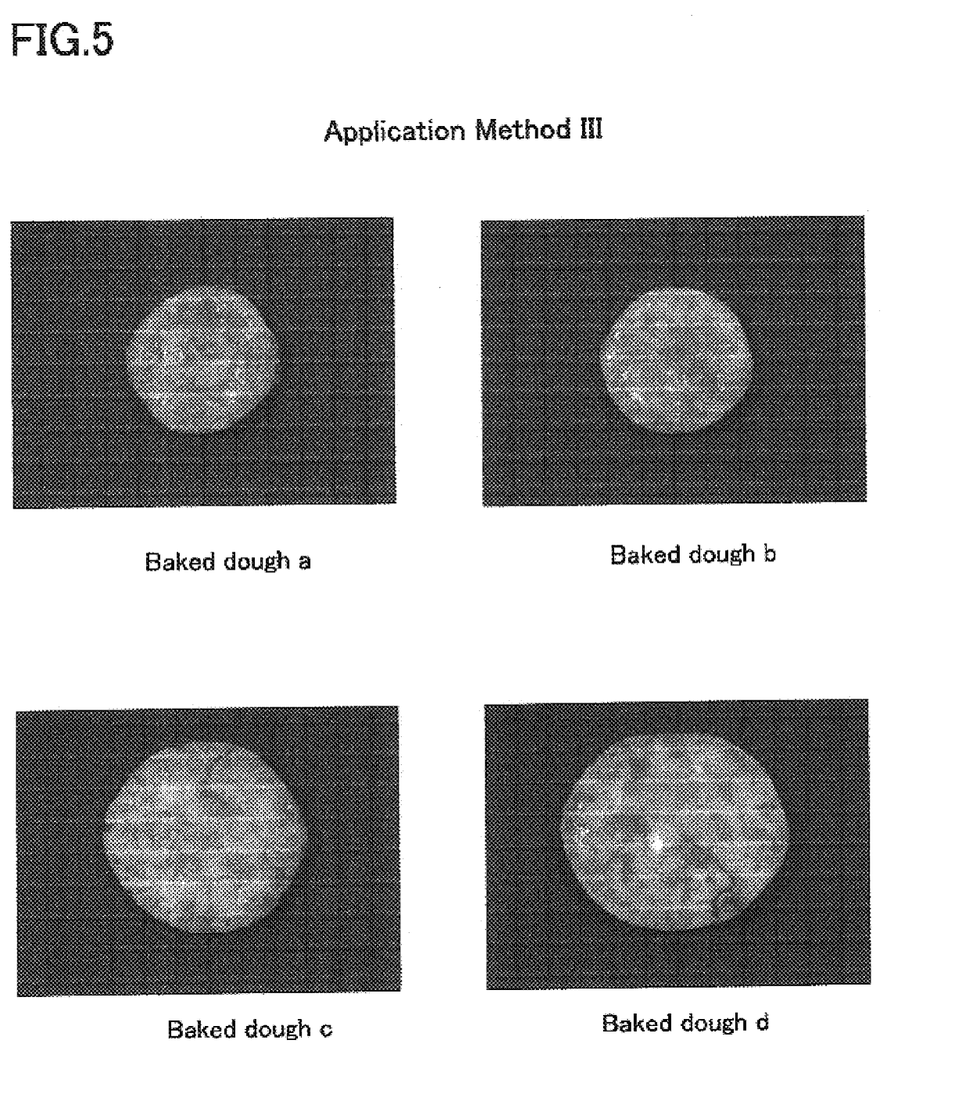
FIG. 5 is a view showing photographs of baked doughs a to d each with a sauce applied thereon by an application method III.
Figure 6:
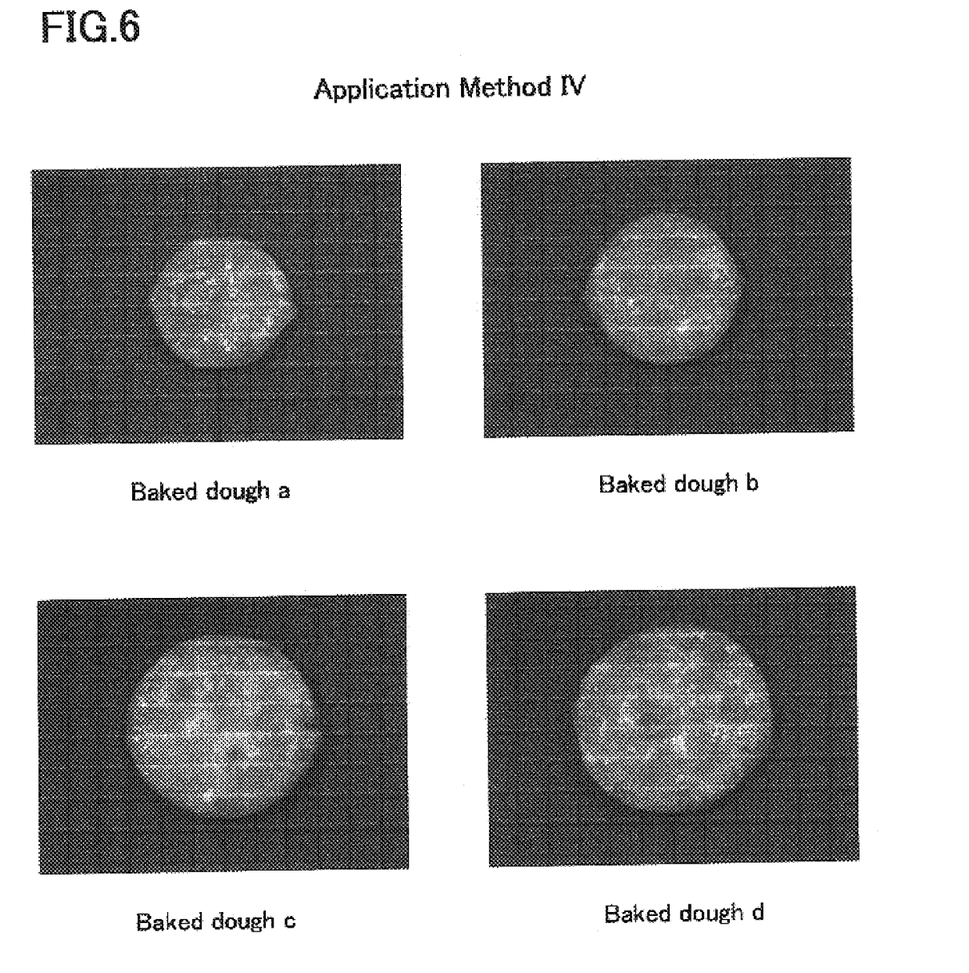
FIG. 6 is a view showing photographs of baked doughs a to d each with a sauce applied thereon by an application method IV.

The deposition amount of the sauce of each rice cracker obtained with the application methods I to IV was determined. The deposition amount of the sauce was determined by subtracting the weight of the baked dough before applying the sauce thereon from the weight of the baked dough (rice cracker) after applying the sauce thereon. For the methods III and IV, it was determined by subtracting the weight of the baked dough after applying the oil thereon from the weight of the baked dough after applying the sauce thereon. The results are shown in Table 8 and FIG. 2. Each deposition amount of sauce in Table 8 and FIG. 2 is represented by the amount per 100 g of baked dough. In Table 8, coating oil indicates the oil applied before applying emulsified sauce.

TABLE 8

Deposition Amount of Sauce

| Baked Dough | Specific volume (cm³/g) | | Application method I | Application method II | | Application method III | Application method IV |
|---|---|---|---|---|---|---|---|
| a | 3 | Baked dough (g) | 100 | 100 | Baked dough (g) | 100 | 100 |
| | | | | | coating oil (g) | 8.6 | 10.9 |
| | | Sauce (g) | 17.5 | 20.5 | Sauce (g) | 10.1 | 14.3 |
| | | Salinity (%) | 1.31 | 1.29 | Salinity (%) | 0.73 | 0.85 |
| b | 4 | Baked dough (g) | 100 | 100 | Baked dough (g) | 100 | 100 |
| | | | | | coating oil (g) | 12.1 | 12.2 |
| | | Sauce (g) | 20.6 | 22.2 | Sauce (g) | 11.8 | 17.1 |
| | | Salinity (%) | 1.52 | 1.38 | Salinity (%) | 0.82 | 0.99 |
| c | 6 | Baked dough (g) | 100 | 100 | Baked dough (g) | 100 | 100 |
| | | | | | coating oil (g) | 20.5 | 19.5 |
| | | Sauce (g) | 41.7 | 43.8 | Sauce (g) | 22.8 | 31.5 |
| | | Salinity (%) | 2.76 | 2.45 | Salinity (%) | 1.41 | 1.61 |
| d | 7 | Baked dough (g) | 100 | 100 | Baked dough (g) | 100 | 100 |
| | | | | | coating oil (g) | 29.0 | 23.2 |
| | | Sauce (g) | 59.4 | 53.8 | Sauce (g) | 22.4 | 35.0 |
| | | Salinity (%) | 3.61 | 2.88 | Salinity (%) | 1.30 | 1.72 |

With the application methods I and II, the deposition amount showed a remarkable tendency to increase with an increase in specific volume. In contrast, with the application methods III and IV in which oil coating is previously conducted, such a substantial increase in deposition amount as with the application methods III and IV was not observed.

Whereas, with the application method III, there was observed a decrease in deposition amount in the dough d.

For the application method III, conceivably, the deposition amount tends to vary because the sauce is repelled from the surface of the dough, and hence the stable deposition of the sauce thereon is difficult to expect. In contrast, with the application method IV, since the deposition amount of the sauce less varied due to a difference in specific volume, as well as it showed a constant tendency, it was revealed that the deposition of the sauce can be accomplished with stability.

(4-2) Sensory Test

A sensory test on the taste and the appearance was conducted by 8 panelists. Each panelist rated each sample in 3 categories of good, ordinary, and bad. The predominant evaluation was adopted, and the results are shown in Table 9. Whereas, FIGS. 3 to 6 show photographs of the outward appearances of respective rice crackers on which sauces are respectively deposited with the application methods I to IV.

TABLE 9

Sensory Test Results

| Dough | Specific volume (cm³/g) | | Application method I | Application method II | Application method III | Application method IV |
|---|---|---|---|---|---|---|
| a | 3 | Taste | Δ | Δ | x | Δ |
|   |   | Apperance | ○ | ○ | x | ○ |
| b | 4 | Taste | Δ | Δ | x | Δ |
|   |   | Apperance | ○ | ○ | x | Δ |
| c | 6 | Taste | Δ | ○ | x | ○ |
|   |   | Apperance | Δ | ○ | x | ○ |
| d | 7 | Taste | x | Δ | x | ○ |
|   |   | Apperance | x | Δ | x | Δ |

With the application method III, the evaluations on the taste and the appearance were not good for all the doughs a to d. This is mainly attributable to the following facts. That is, nonuniformity occurs because the sauce is repelled from the surface of the dough, and seasoning is insufficient because of insufficient deposition of the sauce.

As for the doughs a and b, the evaluations on the taste and the appearance were almost not different from one another in any case of the application methods I, II, and IV. It is conceivable that the dough with a small specific volume shows almost no difference according to the method for applying a sauce because of less permeation from the surface.

As for the dough (c), with the application methods II and IV, the evaluations of "good" was obtained both on the taste and the appearance. Namely, it is indicated that the application methods II and IV are preferable for the dough with a specific volume of about 6.

However, as shown in Table 8, with the application method II, the deposition amount of the sauce is increased, and accordingly, the salinity is increased. There was observed no difference in evaluation since the panelists had eaten only small amounts thereof in the sensory test. However, it is predicted that more panelists judge the salinity (2.45% (Table 8)) according to the application method II as being too salty when they eat much.

As for the dough d, the evaluations with the application methods I and II were low. Whereas, for the application method IV, an evaluation of "good" was obtained on the taste. However, an evaluation of "ordinary" was given due to the occurrence of deposition nonuniformity to some degree for the appearance.

Apparent from the results of the foregoing "measurement of deposition amount of sauce" (4-1), in the case of the soft-baked type with a large specific volume, when the sauce is directly applied on the baked dough, the deposition amount sharply increases with an increase in specific volume regardless of the properties of the sauce. Further, with the method in which an oil is coated on the surface of the baked dough and then an emulsified sauce is applied thereon, the deposition amount shows a minuscule increase at a constant rate, and thus there is observed less changes than the case where the sauce is directly applied thereon. Therefore, it is conceivable that, with the method for applying the emulsified sauce after coating the oil, there is substantially almost no influence on the deposition amount so long as the specific volume change is minuscule.

Further, in the results of the sensory test of the foregoing paragraph (4-2), with the application method IV, the evaluations of "ordinary" or greater are obtained for the doughs of all specific volumes.

These results indicate that the method of the present invention is very effective as a method for applying a sauce onto such a rice cracker that a precise control of the specific volume of the baked dough is difficult. With the method for manufacturing the soft-baked rice cracker, in actuality, the specific volume delicately varies. If the deposition amount of the sauce largely varies with the variation, the stability of quality cannot be held. The variations in deposition amount of the sauce causes not only the variation in taste but also a necessity for adjusting the drying conditions in the manufacturing process, and further results in the complication of the manufacturing process. Therefore, it can be said that uniform deposition of a sauce in a constant amount on the surface of the dough of any specific volume type is an important technology in terms of quality of the rice cracker, simplification of the manufacturing process, and the like. According to the present invention, it is possible to apply a sauce in a constant amount uniformly on the surface of the dough with ease even if the specific volume is increased. Consequently, the present invention is very useful as a application method of a sauce and a method for manufacturing a rice cracker.

The present invention may be embodied in various other forms without departing from the spirit or essential characteristics thereof. The foregoing embodiments are therefore illustrative and should not be construed as being restrictive. Namely, the scope of the invention is defined by the appended claims rather than by specific embodiments in this specification. Further, any modifications and changes falling within an equivalent range of the scope of the appended claims fall within the scope of this invention.

What is claimed is:

1. A method for manufacturing a soft-baked rice cracker, comprising the steps of:
   steam-kneading a mixture of rice powder and water to form a rice dough;
   knead-extruding the rice dough and forming a piece from the rice dough;
   conducting a first drying step for drying the piece;
   conducting a second drying step for drying the piece at a temperature higher than that at the first drying step;
   baking the piece to produce the soft-baked rice cracker having a specific volume of 5.0 to 6.5 cm³/g;
   coating a surface of the rice cracker with oil; and
   applying emulsified sauce onto the surface of the rice cracker coated with the oil, said emulsified sauce having a viscosity of 50 to 800 cp.

2. The method for manufacturing a soft-baked rice cracker according to claim 1, wherein the oil is vegetable oil.

3. The method for manufacturing a soft-baked rice cracker according to claim 1, wherein the emulsified sauce contains soy sauce as aqueous sauce, at least one of safflower oil and rice oil as an oil component, and at least one of lecithin and monoglyceride as an emulsifier.

4. The method for manufacturing a soft-baked rice cracker according to claim 1, further comprising the steps of, before steam-kneading the mixture of the rice powder and water, washing rice grains and milling the rice grains to produce the rice powder; and conducting a third drying step for drying the rice cracker coated with the oil and the emulsified sauce after applying the emulsified sauce onto the surface of the rice cracker.

5. The method for manufacturing a soft-baked rice cracker according to claim 4, wherein in producing the soft-baked rice cracker, said piece is baked in a first baking step, a second baking step, and a third baking step, said mixture of the piece in the second baking step being baked at a temperature higher than those in the first baking step and the third baking step.

6. The method for manufacturing a soft-baked rice cracker according to claim 1, wherein said first drying step is conducted at a temperature lower than that in the second drying step.

* * * * *